US009347492B2

(12) United States Patent
Simon et al.

(10) Patent No.: US 9,347,492 B2
(45) Date of Patent: May 24, 2016

(54) RETAINER CAP FOR SHAFT ASSEMBLY

(71) Applicant: STEERING SOLUTIONS IP HOLDING CORPORATION, Saginaw, MI (US)

(72) Inventors: Daniel C. Simon, Freeland, MI (US); Kelli J. Bradshaw, Flint, MI (US); Austin S. Harrison, Kawkawlin, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/465,130

(22) Filed: Aug. 21, 2014

(65) Prior Publication Data
US 2015/0057091 A1 Feb. 26, 2015

Related U.S. Application Data

(60) Provisional application No. 61/869,372, filed on Aug. 23, 2013.

(51) Int. Cl.
*B62D 1/16* (2006.01)
*F16C 3/035* (2006.01)
*F16C 33/72* (2006.01)
(Continued)

(52) U.S. Cl.
CPC .............. *F16C 33/723* (2013.01); *B62D 1/16* (2013.01); *B62D 1/20* (2013.01); *F16C 3/035* (2013.01); *F16D 3/065* (2013.01); *F16D 3/84* (2013.01);
(Continued)

(58) Field of Classification Search
CPC ............ B62D 1/16; B62D 1/163; B62D 1/18; B62D 1/19; B62D 1/20; B62D 7/224; F16C 38/035; F16C 29/04; F16C 29/08; F16C 33/723; F16C 2326/24; F16D 3/065; F16D 3/84; F16D 3/841; F16D 3/843
USPC .................................. 464/167, 170, 173, 178
See application file for complete search history.

(56) References Cited

U.S. PATENT DOCUMENTS 3,080,731 A * 3/1963 Atkinson ....................... 464/172
3,797,328 A * 3/1974 Quirk ............................. 74/609
4,694,863 A * 9/1987 Klopp ......................... 138/96 R

FOREIGN PATENT DOCUMENTS

EP 0805090 A1 * 11/1997
EP 1065397 A1 1/2001
(Continued)

OTHER PUBLICATIONS

European Search Report for Application No. 14181942.5 dated May 27, 2015.

*Primary Examiner* — Josh Skroupa
(74) *Attorney, Agent, or Firm* — Cantor Colburn LLP

(57) ABSTRACT

A retainer cap for a rolling element shaft assembly includes a yoke, a solid shaft, and a tubular shaft. The retainer cap includes a body having a first end, a second end, an outer surface, and an inner surface defining an internal cavity to receive the tubular shaft, an axial end surface disposed at the first end and defining a first opening to receive the solid shaft, and a second opening defined in the body second end to receive the tubular shaft after insertion through the first opening. The retainer cap further includes a first tab extending from the axial end surface into the internal cavity, and a second tab extending from the axial end surface into the internal cavity.

13 Claims, 2 Drawing Sheets

(51) Int. Cl.
*F16D 3/84* (2006.01)
*F16D 3/06* (2006.01)
*B62D 1/20* (2006.01)
*F16C 29/04* (2006.01)
*F16C 29/08* (2006.01)

(52) U.S. Cl.
CPC .............. *F16D 3/841* (2013.01); *F16C 29/04* (2013.01); *F16C 29/08* (2013.01); *F16C 2326/24* (2013.01)

(56) References Cited

FOREIGN PATENT DOCUMENTS

| | | |
|---|---|---|
| EP | 1464854 A2 | 10/2004 |
| EP | 2806176 A1 | 11/2014 |
| GB | 2091381 A | 7/1982 |

\* cited by examiner

RETAINER CAP FOR SHAFT ASSEMBLY

CROSS-REFERENCES TO RELATED APPLICATIONS

This patent application claims priority to U.S. Provisional Patent Application Ser. No. 61/869,372, filed Aug. 23, 2013 which is incorporated herein by reference in its entirety.

FIELD OF THE INVENTION

The present disclosure generally relates to shaft assemblies and, more specifically, to rolling element retainer caps for a vehicle intermediate shaft assembly.

BACKGROUND OF THE INVENTION

Intermediate shafts (I-shafts) are designed to be a component of torque transfer from a steering column to a steering gear. They may also allow axial movement while maintaining this ability to transfer torque. I-shafts that utilize ball bearings that roll between a metal solid shaft and a metal tubular shaft are commonly referred to as rolling element I-shafts.

Such I-shafts may include retainer caps designed to contain the ball bearings and keep out undesired contaminants. Retainer caps traditionally include a snap feature and a ball stop. The snap feature is a bendable section of the retainer cap that can be displaced to a desired limit and then snapped into a recessed mating surface on the tube. The ball stop is a surface or feature that can stop rolling ball bearings during collapse or extension without deforming or failing.

Previous designs have required the retainer cap to be placed on the solid shaft before a stake yoke is pressed onto the solid shaft. However, the cap may be loose on the solid shaft before the yoke is pressed, thereby requiring the loose retainer cap and solid shaft be kept upright and away from possible crushing loads. Were the retainer cap to be damaged after the stake yoke is pressed, the assembly may be discarded as scrap. Accordingly, it is desirable to provide an improved retainer cap.

SUMMARY OF THE INVENTION

In one aspect, a retainer cap for a rolling element shaft assembly having a yoke, a solid shaft, and a tubular shaft is provided. The retainer cap includes a body having a first end, a second end, an outer surface, and an inner surface defining an internal cavity to receive the tubular shaft, an axial end surface disposed at the first end and defining a first opening to receive the solid shaft, and a second opening defined in the body second end to receive the tubular shaft after insertion through the first opening. The retainer cap further includes a first tab extending from the axial end surface into the internal cavity, and a second tab extending from the axial end surface into the internal cavity.

In another aspect, a rolling element shaft assembly is provided. The assembly includes a solid shaft having a first end and a second end, a tubular shaft configured to receive the shaft first end, a plurality of ball bearings disposed between the solid shaft and the tubular shaft, and a retainer cap disposed about the solid shaft and coupled to the tubular shaft. The retainer cap includes a body having a first end, a second end, an outer surface, and an inner surface defining an internal cavity to receive the tubular shaft, an axial end surface disposed at the first end and defining a first opening to receive the solid shaft, and a second opening defined in the body second end to receive the tubular shaft after insertion through the first opening. The retainer cap further includes a first tab extending from the axial end surface into the internal cavity, and a second tab extending from the axial end surface into the internal cavity.

In yet another aspect, a method of assembling a rolling element shaft assembly is provided. The method includes providing a solid shaft having a first end and a second end, providing a yoke, and providing a retainer cap. The method further includes coupling the yoke to the solid shaft first end, and inserting the retainer cap over the solid shaft second end after the yoke is coupled to the solid shaft first end.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
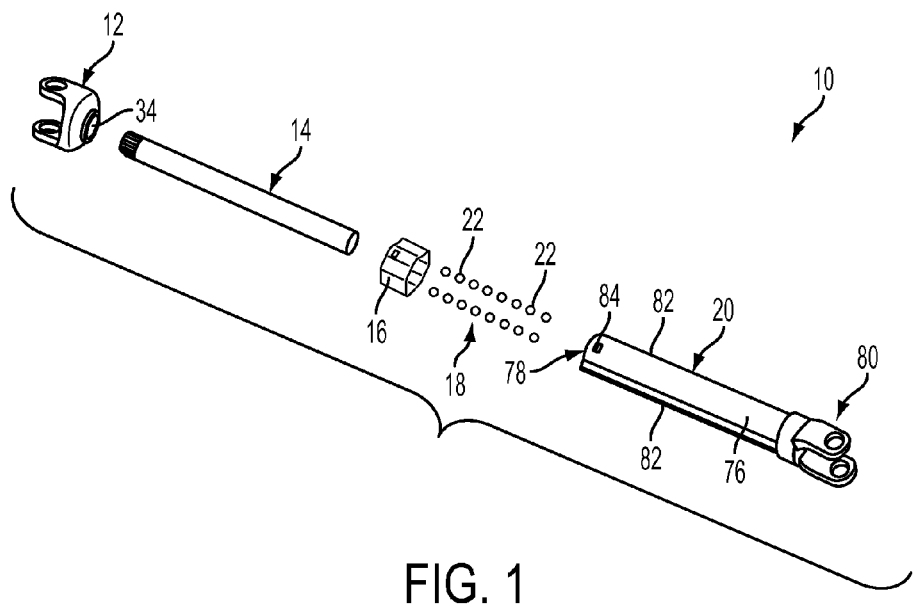
FIG. 1 is an exploded view of an exemplary shaft assembly.

Referring now to the Figures, where the invention will be described with reference to specific embodiments, without limiting same, FIG. 1 illustrates an exemplary rolling element intermediate shaft (I-shaft) assembly 10 that generally includes a yoke 12, a solid shaft 14, a retainer cap 16, a roller assembly 18, and a tubular shaft 20. Roller assembly 18 includes ball bearings 22 and may include a sleeve or wear plate (not shown) to receive and align ball bearings 22. In the exemplary embodiment, I-shaft assembly 10 is configured for use in a vehicle steering column assembly (not shown). However, shaft assembly 10 described herein may be used in any other suitable system.

Figure 2:
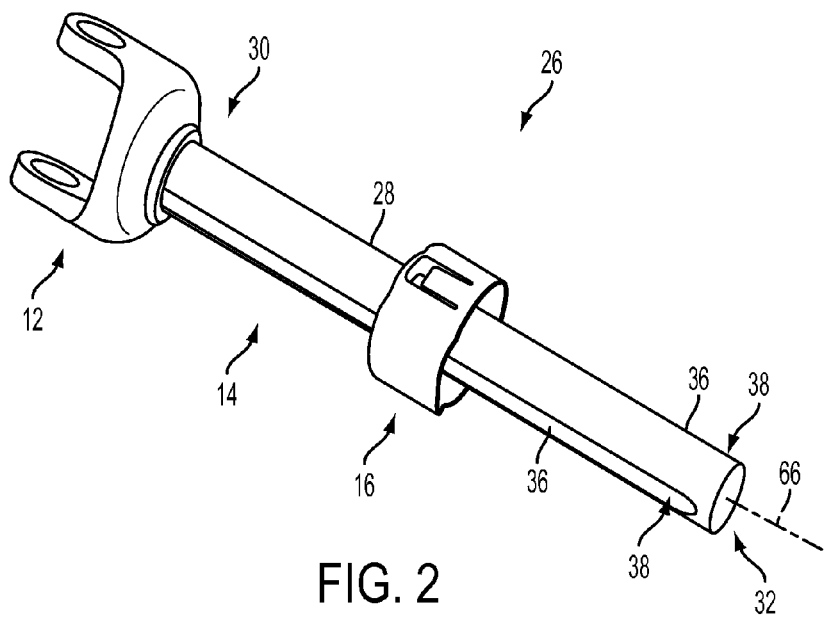
FIG. 2 is a perspective view of an exemplary solid shaft subassembly of the assembly shown in FIG. 1.

FIG. 2 illustrates a solid shaft sub assembly 26 that generally includes yoke 12, solid shaft 14, and retainer cap 16. Solid shaft 14 includes a solid body 28 having a first end 30 and a second end 32. First end 30 is configured for insertion into an aperture 34 of yoke 12 (see FIG. 1) to facilitate coupling therebetween, and second end 32 is configured for insertion into tubular shaft 20. Solid body 28 includes grooves 36, which extend axially along the length of solid shaft 14 and include a ball stop 38 to limit ball bearing 22 movement. Although two grooves 36 are illustrated, solid shaft 14 may have any number of grooves that enables assembly 10 to function as described herein. For example, solid shaft 14 may have three or four grooves 36.

Figure 3:
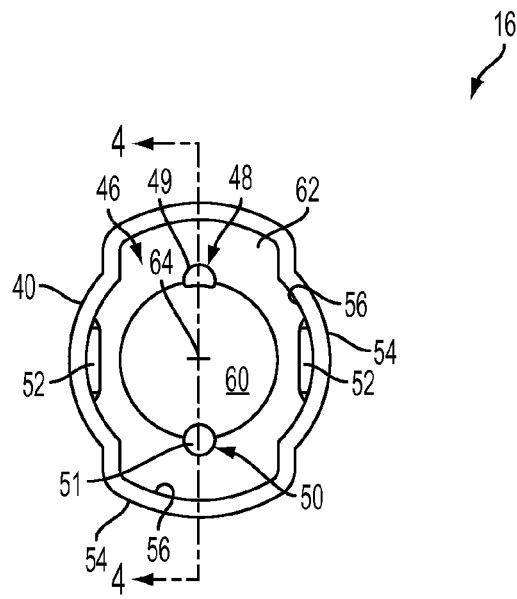
FIG. 3 is a bottom view of an exemplary retainer cap shown in FIGS. 1 and 2.
Figure 4:
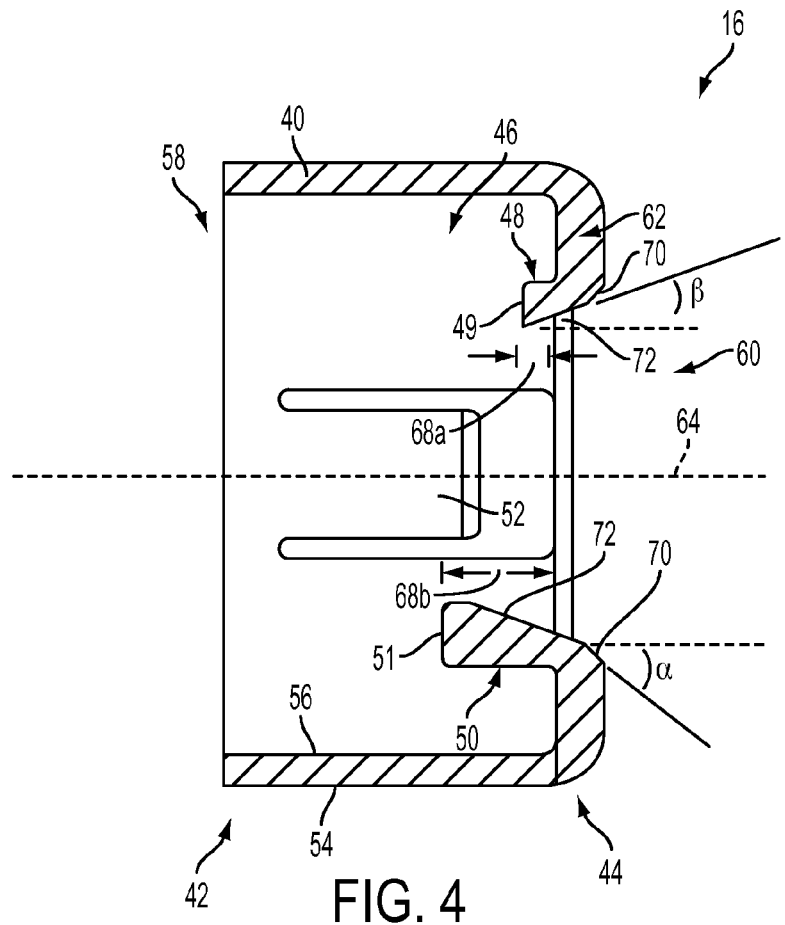
FIG. 4 is a cross-sectional view of the retainer cap shown in FIG. 3.

FIGS. 3 and 4 illustrate retainer cap 16, which generally includes a body 40 having a first end 42, a second end 44, and an internal cavity 46 to receive solid shaft 14. Retainer cap 16 further includes a first pin or tab 48, a second pin or tab 50, and opposed clip members 52.

With reference to FIG. 4, retainer cap 16 includes an outer radial surface 54 and an inner radial surface 56, which defines internal cavity 46. Cap first end 42 defines an opening 58, and cap second end 44 includes an axial end surface 62, which extends radially inboard from inner radial surface 56 toward a cap central axis 64. Second end 44 also defines an opening 60 therein to receive shaft 14. In the exemplary embodiment, cap central axis 64 is coincident with a shaft axis 66 (shown in FIG. 2). Alternatively, central axis 64 may be offset from shaft axis 66.

First and second tabs 48, 50 extend axially from end surface 62 toward first end 42. In the exemplary embodiment, tabs 48, 50 are spaced 180 degrees or approximately 180 degrees apart. However, tabs 48, 50 may be spaced at any suitable angular spacing (e.g. 120 degrees, 90 degrees, etc.). Moreover, retainer cap 16 may include more than one of each tab 48, 50, including various combinations thereof. For example, retainer cap 16 may include two first tabs 48 and two second tabs 50, or one first tab 48 and two second tabs 50, or two first tabs 48 and one second tab 50. In alternative embodiments, retainer cap 16 may include one or more additional tabs (not shown) having a different axial length than both tabs 48, 50.

Tabs 48, 50 are configured and positioned to stop motion of ball bearings 22 without binding and to withstand loads from the rolling ball bearings 22 applied during installation or operation. For example, tab 48 includes an end surface 49 and tab 50 includes an end surface 51. End surfaces 49, 51 are configured to contact and stop ball bearings 22.

As shown, tabs 48, 50 have differing axial lengths 68, with first tab 48 having a first axial length 68a and second tab 50 having a second axial length 68b that is longer than first axial length 68a. Axial lengths 68a, 68b differ to ensure that only one ball bearing track will contact a tab 48, 50 at any one time, thereby facilitating prevention of ball bearing binding in channel grooves 36. In some embodiments, the difference between axial lengths 68a and 68b is not equal to a ball bearing diameter, thus preventing simultaneous contact at both tabs 48, 50.

As illustrated in FIG. 4, tabs 48, 50 and axial end surface 62 define a lead-in chamfer 70, and tabs 48, 50 are tapered to define an insertion chamfer 72. Chamfers 70, 72 to facilitate insertion of solid shaft 14 into retainer cap 16 after installation of yoke 12 to shaft first end 30. In some known I-shaft assemblies, a retainer cap needed to be inserted onto the yoke attachment end prior to attachment of the yoke because the cap could not fit over the shaft end with ball stops. However, in the exemplary embodiment, retainer cap 16 is fabricated from an elastically deformable material that allows elastic deformation of cap 16 during installation to and/or removal from shaft 14 by hand. For example, cap 16 may be fabricated from a semi-flexible, hard plastic material. However, retainer cap 16 may be fabricated from any suitable material that enables cap 16 to function as described herein. As such, retainer cap 16 may be inserted over shaft second end 32 after attachment of yoke 12.

In the exemplary embodiment, chamfer 70 is oriented at an angle 'α' with respect to cap axis 64, and chamfer 72 is oriented at an angle 'β' with respect to cap axis 64. In one embodiment, angle 'α' is between 40° and 50° or between approximately 40° and approximately 50°. In another embodiment, angle 'α' is 45° or approximately 45°. In one embodiment, angle 'β' is between 35° and 45° or between approximately 35° and 45°. In another embodiment, angle 'β' is between 38° and 42° or between approximately 38° and approximately 42°. However, angles 'α' and 'β' may be any suitable angle that enables retainer cap 16 to function as described herein.

With further reference to FIG. 1, tubular shaft 20 generally includes a tubular body 76 having an open end 78 and a yoke end 80. Open end 78 is configured to receive roller assembly 18 and solid shaft second end 32, and yoke end 80 is configured to couple to the steering column assembly (not shown). Tubular body 76 includes an inner wall (not shown) having axially extending grooves 82 formed therein. Grooves 82 are configured to receive sleeves or wear plates (not shown), which are configured to receive ball bearings 22 at least partially therein. For example, the sleeve/wear plate is disposed inside tubular shaft 20 and ball bearings 22 are disposed between the sleeve/wear plate and solid shaft grooves 36. Tubular body 76 also includes one or more slots 84 configured to receive clip members 52 therein to retain cap 16 on tubular shaft open end 78. However, cap 16 may be coupled to tubular shaft 20 in any suitable manner.

With reference to FIGS. 1-4, assembly of I-shaft assembly 10 includes providing yoke 12, solid shaft 14, retainer cap 16, roller assembly 18, and tubular shaft 20. Yoke 12 is coupled to solid shaft first end 30, and retainer cap 16 is subsequently inserted onto solid shaft second end 32. As such, chamfers 70, 72 facilitate insertion of second end 32 into opening 60 toward and through opening 58. As shaft second end 32 contacts chamfers 72, tabs 48, 50 are elastically deformed outwardly toward cap inner radial surface 56, which provides clearance around second end 32 until tabs 48, 50 reach shaft grooves 36. At this point, tabs 48, 50 flex inwardly and are seated within grooves 36. Shaft second end 32 is then inserted into tubular shaft open end 78, and ball bearings 22 are subsequently inserted into the sleeve/wear plates disposed in grooves 82. Cap 16 is then inserted over tubular shaft 20 such that cap first opening 58 receives tubular shaft open end 78 until clip members 52 are seated within slots 84. As such, retainer cap 16 is coupled to tubular shaft 20 to facilitate securing ball bearings 22 between shaft 14 and sleeve/wear plates disposed in tube 20 and preventing foreign objects or contaminants from getting into tubular shaft 20, which may hinder operation of roller assembly 18.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A retainer cap for a rolling element shaft assembly having a yoke, a solid shaft, and a tubular shaft, the retainer cap comprising:
   a body having a first end, a second end, an outer surface, and an inner surface defining an internal cavity to receive the tubular shaft;
   an axial end surface disposed at the first end and defining a first opening to receive the solid shaft;
   a second opening defined in the body second end to receive the tubular shaft after insertion through the first opening;
   a first tab extending from the axial end surface into the internal cavity; and
   a second tab extending from the axial end surface into the internal cavity, the first tab having a first length and the second tab having a second length that is greater than the first length, wherein both the first and second tabs are fabricated from an elastically deformable material such that the first and second tabs are flexed outward to facilitate clearance for the tubular shaft when the tubular shaft is inserted into the first opening.

2. The retainer cap of claim 1, wherein the first and second tabs extend axially from the axial end surface.

3. The retainer cap of claim 1, wherein the cap first end defines a chamfer to facilitate insertion of the solid shaft into the first opening.

4. The retainer cap of claim 3, wherein the internal cavity of the body is disposed about a cap axis, the chamfer oriented at an angle between approximately 40° and approximately 50° relative to the cap axis.

5. The retainer cap of claim 1, wherein the first and second tabs define a chamfer to facilitate insertion of the solid shaft into the first opening.

6. The retainer cap of claim 5, wherein the internal cavity of the body is disposed about a cap axis, the chamfer oriented at an angle between approximately 38° and approximately 42° relative to the cap axis.

7. A rolling element shaft assembly comprising:
a solid shaft having a first end and a second end;
a tubular shaft configured to receive the shaft first end;
a plurality of ball bearings disposed between the solid shaft and the tubular shaft; and
a retainer cap disposed about the solid shaft and coupled to the tubular shaft, the retainer cap comprising:
a body having a first end, a second end, an outer surface, and an inner surface defining an internal cavity to receive the tubular shaft;
an axial end surface disposed at the first end and defining a first opening to receive the solid shaft;
a second opening defined in the body second end to receive the tubular shaft after insertion through the first opening;
a first tab extending from the axial end surface into the internal cavity; and
a second tab extending from the axial end surface into the internal cavity, the first tab having a first length and the second tab having a second length that is greater than the first length, wherein both the first and second tabs are fabricated from an elastically deformable material such that the first and second tabs are flexed outward to facilitate clearance for the tubular shaft when the tubular shaft is inserted into the first opening.

8. The assembly of claim 7, further comprising a yoke coupled to the solid shaft second end, wherein the retainer cap is inserted over the solid shaft first end after the yoke is coupled to the solid shaft second end.

9. The assembly of claim 7, wherein the solid shaft includes a first axially extending groove and a second axially extending groove, the first tab disposed at least partially within the first axially extending groove, and the second tab disposed at least partially within the second axially extending groove.

10. The assembly of claim 7, wherein the first and second tabs extend axially from the axial end surface.

11. The assembly of claim 7, wherein the cap first end defines a first chamfer to facilitate insertion of the solid shaft into the first opening, and the first and second tabs define a second chamfer to facilitate insertion of the solid shaft into the first opening.

12. The assembly of claim of claim 11, wherein the internal cavity of the body is disposed about a cap axis, the first chamfer oriented at an angle between approximately 40° and approximately 50° relative to the cap axis.

13. The assembly of claim 11, wherein the internal cavity of the body is disposed about a cap axis, the second chamfer oriented at an angle between approximately 38° and approximately 42° relative to the cap axis.

* * * * *